Feb. 26, 1963 D. B. VINCENT 3,079,012
AUTOMATIC LOADING DEVICE FOR PROCESSING EQUIPMENT
Filed Jan. 9, 1961 4 Sheets-Sheet 1

INVENTOR:
DAVID B. VINCENT
BY Gravely, Lieder & Woodruff
ATTORNEYS.

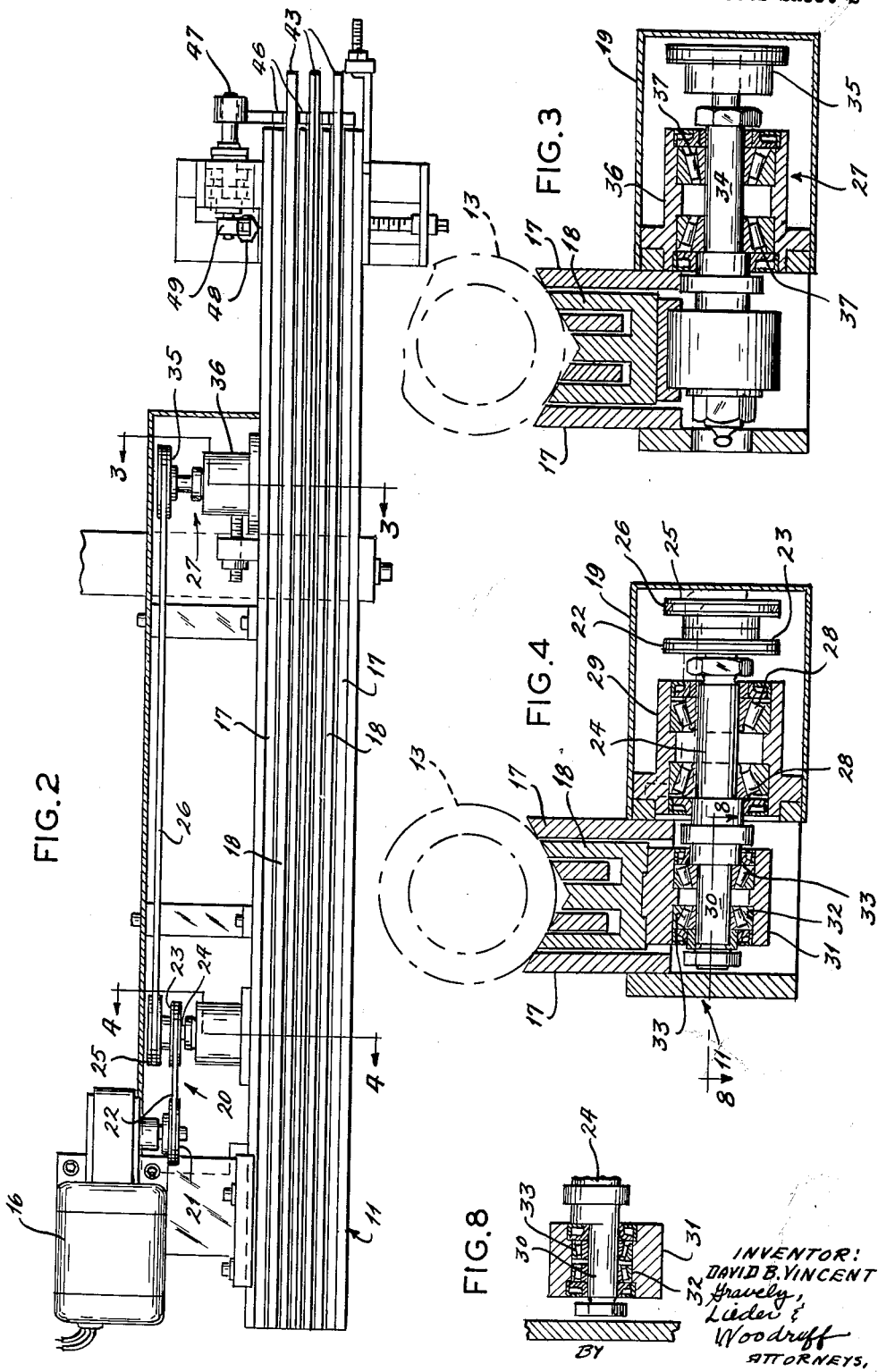

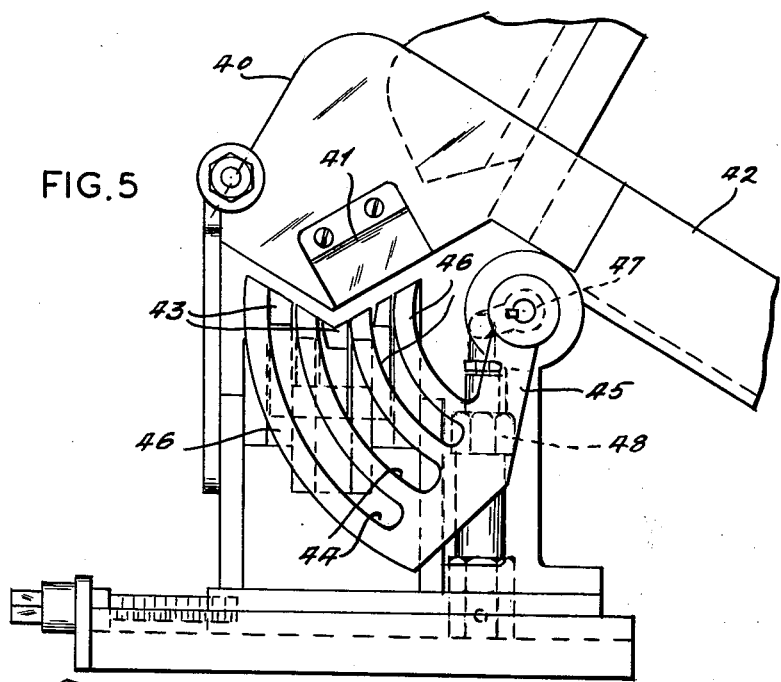
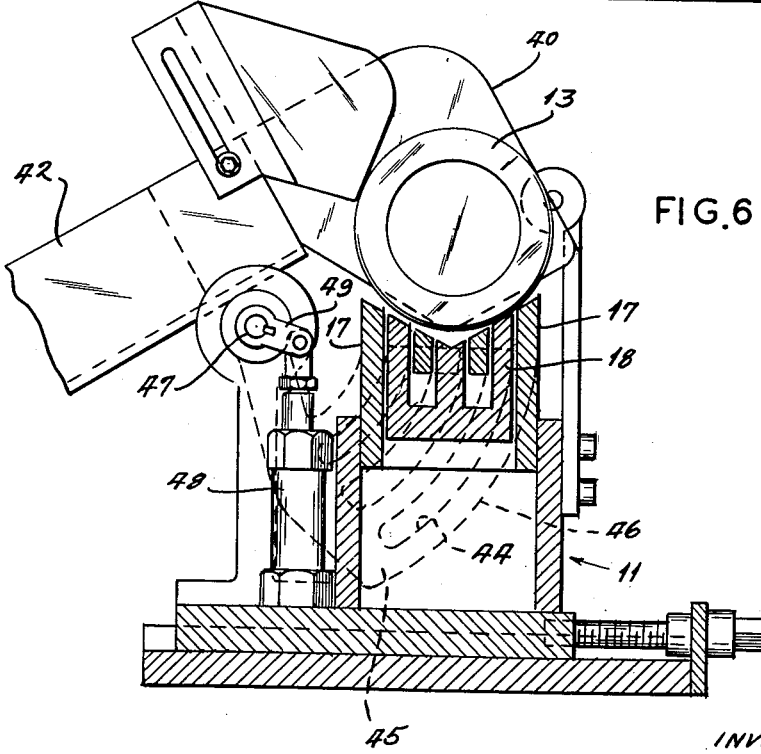

Feb. 26, 1963 D. B. VINCENT 3,079,012
AUTOMATIC LOADING DEVICE FOR PROCESSING EQUIPMENT
Filed Jan. 9, 1961 4 Sheets-Sheet 4
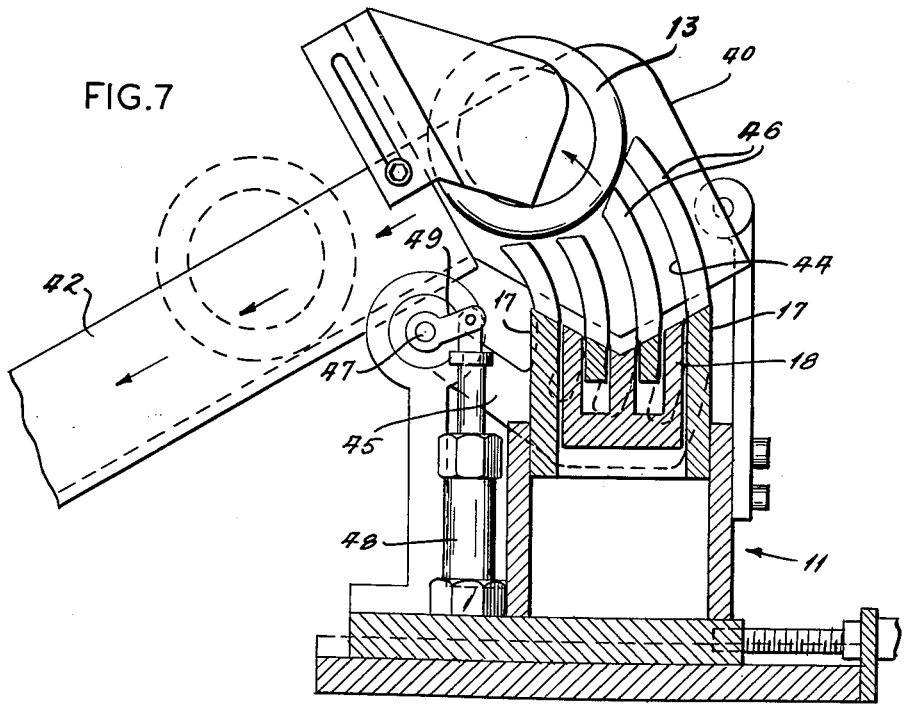
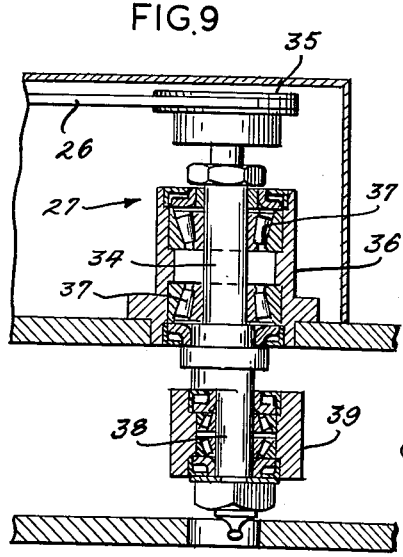
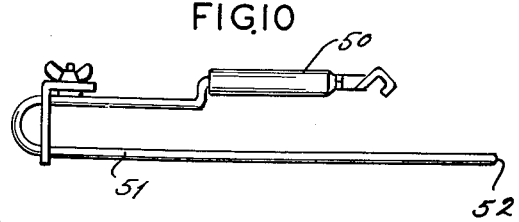
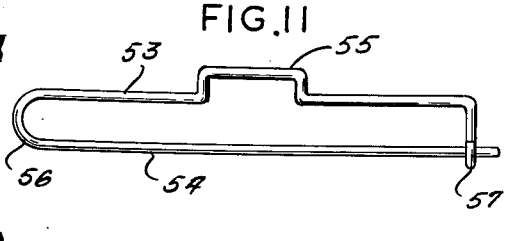
INVENTOR:
DAVID B. VINCENT
BY Gravely, Lieder & Woodruff
ATTORNEYS.

United States Patent Office 3,079,012
Patented Feb. 26, 1963

3,079,012
AUTOMATIC LOADING DEVICE FOR PROCESSING EQUIPMENT
David B. Vincent, Canton, Ohio, assignor to The Timken Roller Bearing Company, Canton, Ohio, a corporation of Ohio
Filed Jan. 9, 1961, Ser. No. 81,381
4 Claims. (Cl. 214—1)

The present invention relates to an automatic loading device for processing equipment such as automatic internal or external grinders, honers, chucking machines, lathes, heat treating equipment and the like. The present invention particularly relates to a novel loading means which cooperates with a series of moving and stationary rails to load objects into automatic processing equipment.

An object of the present invention is to provide a work feeding mechanism for a grinder which is adapted to feed work pieces of tubular cross section automatically at the full capacity of the grinder. It is another object to provide a work handling device whereby the work pieces are not touched individually by human hands before, during or after its journey through the grinding mechanism, but rather can be loaded and unloaded in groups by handling devices.

Another object is to provide rails for moving work toward a grinding area and means cooperating with the feed rails to feed the work into the grinder together with storage rails for storing the finished work.

Another object is to provide a device in which the work is stored in an upright position on the feed and storage rails and occupies less space on the machine, therefore allowing more unattended operator time for the machine. Still another object is to provide a novel method of moving work through a grinding machine.

These and other objects and advantages will become apparent hereinafter.

Briefly, the present invention comprises a walking beam having fingers protruding beyond the end thereof and interlocking with fingers on a movable hand for lifting work objects from the walking beam into a grinding mechanism.

In the drawings:

FIG. 2 is a partially broken top plan view of the feed rail shown in FIG. 1 removed from the grinding machine;

FIG. 3 is a sectional view taken along the line 3—3 of FIG. 2;

FIG. 4 is a sectional view taken along the line 4—4 of FIG. 2;

FIG. 5 is a partially broken greatly enlarged end view of the feed rail and loading mechanism;

FIG. 6 is a sectional view taken along line 6—6 of FIG. 2 with the loading mechanism shown in detail and showing a bearing cone in position to be loaded into a grinding machine;

FIG. 7 is a view similar to FIG. 6 with the bearing cone being loaded into the grinder;

FIG. 8 is a sectional view taken along the line 8—8 of FIG. 4;

FIG. 9 is a sectional view taken along the line 9—9 of FIG. 1;

FIG. 10 is a side elevation of a carrier for moving the objects to the feed rails; and FIG. 11 is a modified carrier.

Figure 1:
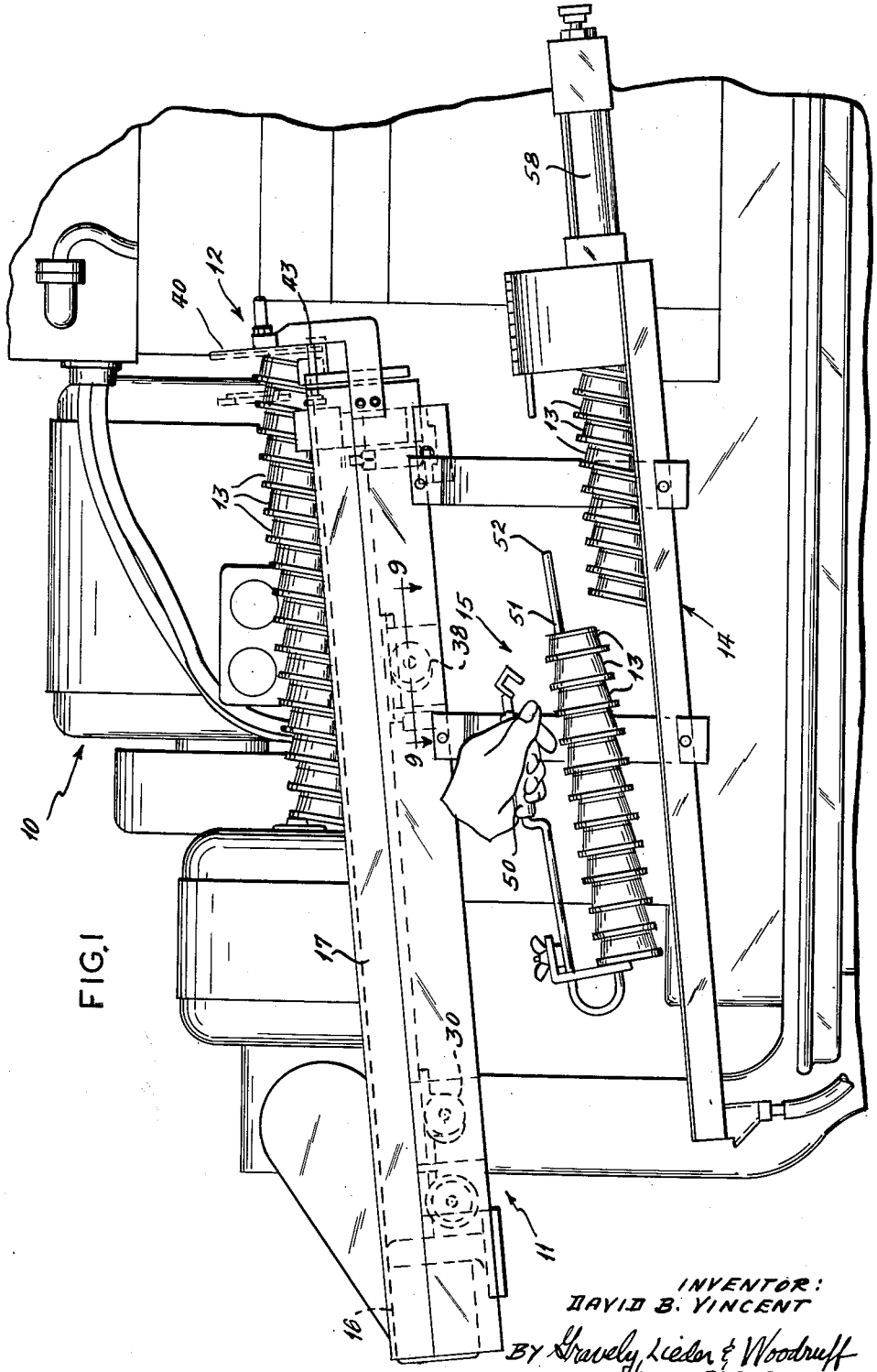
FIG. 1 is a partially broken side elevation of the present invention as applied to a grinding machine.

FIG. 1 shows a grinding machine 10 which can be any of the standard machines well known in the industry and which will not be described in detail in the present invention. Instead of a grinder, the present invention can be utilized with honing equipment, chucking machines, lathes, heat treating equipment, etc. Feed rails 11 and a loading mechanism 12 mounted on the machine 10 cooperate to move the work objects 13 (such as the illustrated bearing cones) in a timed sequence into the grinder 10. A storage rail 14 is provided to receive finished work objects 13 from the grinder 10. The work pieces 13 preferably have a substantially tubular cross section.

FIG. 1 further illustrates how the work handling devices 15 (which will be described in full hereinafter) are used to remove the finished work objects 13 from the storage rail 14 without their ever touching human hands. This is an important consideration with finely ground objects such as bearing cups and cones.

Similar work handling devices 15 can be used to load the work objects 13 onto the feed rails 11.

The walking beam or feed rail mechanism 11 includes a motor 16, a series of stationary rails 17 and a series of movable rails 18 spaced between the stationary rails 17. A housing 19 contains the mechanism for moving the movable rails 18. The actuating mechanism 20 for the movable rails 18 includes a drive pulley 21 driven by the motor 16. A belt 22 connects the drive pulley 21 to a driven pulley 23. The pulley 23 is fastened to a shaft 24 which rotates with the pulley 23 (FIG. 4). A second pulley 25 also is attached to the shaft 24 and rotates therewith. A belt 26 connects the second pulley 25 to a second rail drive mechanism 27 which will be described more fully hereinafter.

The shaft 24 rotates on bearings 28 in a bearing housing 29 positioned inside the housing 19. Motion is imparted to the moving rails 18 by the action of an eccentric portion 30 of the shaft 24 on an eccentric bearing housing 31 (FIG. 8). The eccentric bearing housing 31 is fastened to the moving rails 18 and is provided with an opening 32 which receives bearings 33 on which the eccentric shaft portion 30 rotates. As the shaft 24 rotates, the eccentric portion 30 thereof moves the eccentric bearing housing 31 and the moving rails 18 upwardly and forwardly toward the grinding machine 10.

Toward the front end of the housing 19 a drive mechanism 27 similar to the actuating mechanism 20 is situated. The mechanism 27 includes a shaft 34 with a pulley 35 on one end. The belt 26 connects the pulley 25 on the first eccentric shaft 24 with the pulley 35. The shaft 34 is mounted in a bearing housing 36 on bearings 37 and has an eccentric portion 38 which rotates in a second bearing housing 39 connected to the moving rails 18.

Thus in operation, the motor 16 drives the shafts 24 and 34 in a rotary motion. The eccentric shaft portions 30 and 38 move the bearing housings 31 and 39 in an upward and forward direction during their rotation. Since the bearing housings 31 and 39 are fastened to the moving rails 18, the rails 18 are moved upwardly of the stationary rails 17 thus moving all of the work pieces 13 free of the stationary rails 17. When the moving rails 18 are then moved forwardly toward the loading mechanism 12, the work pieces 13 are moved therewith. As rotation of the eccentric shafts is continued, the moving rails 18 move beneath the stationary rails 17 freely of the work pieces 13, before finally moving back into engagement with the work pieces 13 prior to lifting them from the stationary rails 17 as the foregoing cycle is repeated.

The moving rails 18 move the work pieces 13 toward the loading mechanism 12 until they engage the stop plate 40 where the work pieces 13 are stacked one against the other.

Optionally affixed to the back of the stop plate 40 is a magnet 41 which holds the first working piece in an upright position prior to loading into the feed chute 42 of the grinding machine 10. The magnet 41 is not essential to the functioning of this invention, because the movement of the rails 18 tends to position the work pieces 13 in loading position adjacent to the stop plate 40.

The moving rails 18 have extensions 43 extending outwardly of the ends of the stationary beams 17 which are engaged in curved slots 44 provided in the body of a rotatable slotted ejector arm 45. Thus in operation, the work pieces 13 are moved toward the stop means 40 by the action of the moving rails 18 until they reach the stop means 40 where they are held upright by the magnet 41 until the arm 45 is rotated upwardly so that fingers 46 thereon engage the work piece 13 adjacent to the stop plate 40 and lift said work piece 13 off the moving beam 18 into the feed chute 42 of the loading mechanism 12.

The ejector arm 45 is pivoted at 47 and is actuated by a hydraulic cylinder 48 controlled by the functions of the grinding machine 10. When a work piece is ejected from the grinding machine 10, the hydraulic cylinder 48 is actuated and the ejector arm 45, which is positioned beneath the feed rails 11 and in front of the stop plate 40, moves through the moving rail extensions 43 to lift an unfinished work piece 13 into the feed chute 42. The foregoing cycle is then repeated with each work piece.

FIG. 5 shows the interlocking action of the ejector arm fingers 46 and the moving beam extensions 43 as the arm 45 moves a work piece 13 into the feed chute 42.

FIGS. 6 and 7 show the connection between the ejector arm 45 and hydraulic cylinder 48 in more detail. The ejector arm 45 is pivoted at 47 and is connected by a link 49 to the hydraulic cylinder 48. The mechanism is in the position shown in FIG. 6 before the loading action starts. When the hydraulic cylinder 48 is extended as in FIG. 7, the link 49 is rotated and moves the ejector arm 45 upwardly in a rotary movement so that the work piece 13 is moved into the feed chute 42 as shown by the arrows and the broken lines in FIG. 7. When the hydraulic cylinder 48 is inactivated, the link 49 is rotated in the opposite direction and retracts the ejector arm 45. The ejector arm 45 also may be a slotted plate having an angled top which will eject the work piece from the feed rails by an upward vertical motion. The same relationship between the slots in the ejector arm and the extension fingers on the moving sections of the rails must be maintained as with the hereinbefore described rotatable ejector arm.

FIGS. 10 and 11 show various handling devices. The device shown in FIG. 10 is used for lifting the work pieces onto the feed rails 11 and off of the storage rails 14 while the device shown in FIG. 11 is used for handling the work pieces in boxes or pans.

The device shown in FIG. 10 includes a handle 50, a U-shaped rod 51 having an elongated free end 52 which is inserted into the center openings of the work pieces 13.

The device shown in FIG. 11 includes parallel bars 53 and 54 with a handle 55 formed in bar 53 and a U-shaped spring 56 connecting the bars 53 and 54. A catch mechanism is connected to the bar 53 and includes a hook 57 adapted to engage the free end of the bar 54 to lock the work pieces between the bars 53 and 54.

The storage rails 14 shown in FIG. 1 include a hydraulic cylinder 58 for moving the finished work pieces 13 away from the unloading chute along the storage rail 14 to clear the way for another finished work piece. Magnets are provided to hold the work pieces 13 in an upright position when they are on the storage rail 14.

Thus it is apparent that the present invention provides all of the objects and advantages sought therefor.

This invention is intended to cover all changes and modifications of the examples of the invention herein chosen for purposes of the disclosure, which do not constitute departures from the spirit and scope of the invention.

What is claimed is:

1. A loading mechanism for a processing machine comprising a feed mechanism for holding work pieces including a series of movable and stationary rails, spaced extensions on the movable rails, means adjacent to said rail extensions to position the most advanced work piece in a loading position to be moved into the processing machine, and loading means timed with said processing machine to feed work pieces to said machine at its rate of processing said work pieces, said loading means comprising a loading arm pivoted to a support, spaced fingers on said arm constructed and arranged to mesh with the rail extensions to move the work piece positioned in a loading position into the processing machine, and means for actuating said loading arm.

2. A loading mechanism for a processing machine comprising a feed rail mechanism including movable rails and stationary rails, said feed rail mechanism being adapted to hold and move work objects toward a processing area, cam actuating means for said movable rails to move said rails out of the plane of the stationary rails and forwardly on the stationary rails thereby carrying the work pieces along the feed rail toward the processing area, spaced extension members on the end of said movable rails, a stop plate positioned adjacent to the end of said stop means in an upright position, and a mechanism to lift said uprightly positioned work piece off the extended portion of the feed rail into the processing machine, said mechanism comprisng a support, an arm pivoted to said support, an actuating mechanism for said arm, means linking said actuating mechanism to said arm, said actuating mechanism being integrated with the processing machine to actuate said arm only when the machine is in condition to receive a work piece, and spaced fingers on said arm, said fingers constructed and arranged to interlock with the rail extensions to engage the uprightly positioned work piece when actuated and to move said work piece off said rail extensions into the processing machine.

3. A loading mechanism for a processing machine comprising a feed rail mechanism including movable rails and stationary rails, said feed rail mechanism being adapted to hold and move work objects toward a processing area, eccentric cam actuating means for said movable rails to move said rails out of the plane of the stationary rails and forwardly on the stationary rails thereby carrying the work pieces along the feed rail toward the processing area, spaced elongated extension members on the end of said movable rails nearer the processing area, said extension members defining an unobstructed area between each of said members, a stop plate positioned adjacent to said extension members, magnet means adjacent to said stop means to locate in an upright position that work piece which is moved onto said extension members and adjacent to said stop means, and mechanism for lifting said uprightly positioned work piece off said extension members into a processing machine, said mechanism comprising a loading member, spaced fingers on said loading member constructed and arranged to move through the areas between said extension members to move the uprightly positioned work piece into a processing machine and an actuating mechanism constructed and arranged to move said loading member.

4. A loading mechanism for a processing machine comprising a feed mechanism to hold work objects, means to move said objects toward a processing area, spaced extension members on the end of said feed mechanism nearer the processing area, means adjacent to said spaced extension members to position a work piece in a loading position to be moved into the processing machine, and a loading mechanism to lift said work piece off the extension members into the processing machine, said loading mechanism comprising a spaced finger on said arm constructed and arranged to mesh with the spaced extension members when said arm is actuated thereby lifting said work piece toward the processing machine from said extension members, an actuating mechanism for said arm, and means linking said actuating mechanism to said arm, said actuating mechanism being integrated with the processing machine to actuate said arm only when the machine is in condition to receive a work piece.

References Cited in the file of this patent
UNITED STATES PATENTS

| | | |
|---|---|---|
| 287,727 | Ross | Oct. 30, 1833 |
| 1,027,124 | Griffith | May 21, 1912 |
| 1,082,387 | Ahlen et al. | Dec. 23, 1913 |
| 1,919,394 | Rosenkranz | July 25, 1933 |
| 2,597,826 | Ingram et al. | Dec. 25, 1951 |
| 2,597,941 | Long | May 27, 1952 |
| 2,676,693 | Autenrieth | Apr. 27, 1954 |
| 2,702,130 | Grau | Feb. 15, 1955 |
| 2,733,641 | Praeg | Feb. 7, 1956 |
| 2,910,192 | Wells | Oct. 27, 1959 |
| 2,957,573 | Eyster | Oct. 25, 1960 |
| 3,003,615 | Ruppe | Oct. 10, 1961 |

FOREIGN PATENTS

| | | |
|---|---|---|
| 447,994 | Canada | Apr. 20, 1948 |